(12) United States Patent
Wilson et al.

(10) Patent No.: US 10,837,747 B2
(45) Date of Patent: Nov. 17, 2020

(54) HIGH EXPLOSIVE FIRING MECHANISM

(71) Applicant: GOODRICH CORPORATION, Charlotte, NC (US)

(72) Inventors: Brian Wilson, Vacaville, CA (US); Kevin Mueller, Dixon, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/897,840

(22) Filed: Feb. 15, 2018

(65) Prior Publication Data
US 2019/0249970 A1   Aug. 15, 2019

(51) Int. Cl.
| | |
|---|---|
| F42C 15/34 | (2006.01) |
| F42C 15/32 | (2006.01) |
| F42C 7/00 | (2006.01) |
| F42D 1/04 | (2006.01) |
| F42C 19/10 | (2006.01) |
| B64D 25/08 | (2006.01) |

(52) U.S. Cl.
CPC ............... *F42C 15/34* (2013.01); *F42C 7/00* (2013.01); *F42C 15/32* (2013.01); *F42D 1/043* (2013.01); *B64D 25/08* (2013.01); *F42C 19/10* (2013.01)

(58) Field of Classification Search
CPC .......... F42C 15/34; F42C 15/32; F42C 19/10; F42C 7/00; B64D 25/08; F42D 1/043
USPC ......................................................... 102/204
See application file for complete search history.

(56) References Cited

U.S. PATENT DOCUMENTS

| | | | | |
|---|---|---|---|---|
| 831,947 A | * | 9/1906 | Graeme et al. | F42C 19/10 102/204 |
| 2,394,425 A | * | 2/1946 | Martin | B64C 1/32 244/121 |
| 2,873,648 A | * | 2/1959 | Musser | B64C 1/32 89/1.14 |
| 3,129,663 A | | 4/1964 | Schnepfe, Jr. | |
| 3,312,430 A | * | 4/1967 | Martin | B64D 25/10 244/122 A |
| 3,356,025 A | * | 12/1967 | Duncan | F42C 7/12 102/530 |
| 3,575,111 A | * | 4/1971 | Richardson | F42B 4/26 102/204 |
| 3,610,151 A | | 10/1971 | Nett | |
| 3,640,225 A | * | 2/1972 | Carlson | F42C 9/06 102/237 |
| 3,658,006 A | * | 4/1972 | Nistler | F42B 3/08 102/307 |

(Continued)

FOREIGN PATENT DOCUMENTS

| | | |
|---|---|---|
| EP | 0154532 | 9/1985 |
| JP | 2004190969 A | 7/2004 |

OTHER PUBLICATIONS

European Patent Office, European Search Report dated Jun. 4, 2019 in Application No. 18213155.7.

*Primary Examiner* — Michelle Clement
(74) *Attorney, Agent, or Firm* — Snell & Wilmer L.L.P.

(57) ABSTRACT

The present disclosure provides a high explosive firing mechanism. The high explosive firing mechanism may comprise a housing comprising a firing pin tube having a primer inlet. The high explosive firing mechanism may further comprise a firing pin disposed within the firing pin tube, the firing pin comprising a nub. The nub may partially extend into the primer inlet.

18 Claims, 3 Drawing Sheets

(56) References Cited

U.S. PATENT DOCUMENTS

| | | | | |
|---|---|---|---|---|
| 3,712,221 A | * | 1/1973 | Voigt, Jr. | F42D 5/045 89/1.14 |
| 3,778,010 A | * | 12/1973 | Potts | B64C 1/1476 244/121 |
| 3,788,227 A | * | 1/1974 | Clifton | F42C 19/0807 102/204 |
| 3,789,761 A | | 2/1974 | Travor | |
| 3,823,669 A | * | 7/1974 | Zacharin | F42C 14/02 102/221 |
| 3,847,329 A | * | 11/1974 | Stanley | B64D 25/08 244/122 AD |
| 3,855,900 A | * | 12/1974 | Barr | F41A 5/24 102/430 |
| 3,885,761 A | * | 5/1975 | Pendergast | B64C 1/32 244/121 |
| 3,893,367 A | * | 7/1975 | Burklund | B64D 25/08 102/202 |
| 3,912,203 A | * | 10/1975 | De Stefano | B64D 25/08 244/122 AD |
| 4,014,264 A | * | 3/1977 | Bendler | F42B 3/125 102/202.6 |
| 4,027,592 A | * | 6/1977 | Hubsch | F42C 1/02 102/202 |
| 4,038,924 A | * | 8/1977 | Beermann | F42C 19/10 102/261 |
| 4,099,465 A | * | 7/1978 | Haake | F42C 15/31 102/204 |
| 4,195,550 A | * | 4/1980 | Witt | F42C 19/085 102/204 |
| 4,202,269 A | * | 5/1980 | Messineo | F42C 7/04 102/204 |
| 4,286,521 A | * | 9/1981 | Marer | F42C 15/31 102/200 |
| 4,301,707 A | * | 11/1981 | Schimmel | B26F 3/04 244/122 AF |
| 4,333,381 A | * | 6/1982 | Boeglin | B60J 9/02 244/122 AF |
| 4,353,304 A | * | 10/1982 | Hubsch | F42C 19/12 102/470 |
| 4,405,104 A | * | 9/1983 | Charman | B64D 25/10 102/202.7 |
| 4,407,468 A | * | 10/1983 | Bement | B26F 3/04 102/378 |
| 4,479,436 A | * | 10/1984 | Wilson | F42D 1/04 102/200 |
| 4,483,250 A | * | 11/1984 | Thurston | F42C 15/34 102/254 |
| 4,495,867 A | * | 1/1985 | Mitchell, Jr. | F42D 1/043 102/275.4 |
| 4,570,879 A | * | 2/1986 | Dupin | B64D 25/08 244/121 |
| 4,574,702 A | * | 3/1986 | Brandt | F42B 10/48 102/244 |
| 4,590,840 A | * | 5/1986 | Proulx | F42B 3/195 86/10 |
| 4,676,163 A | * | 6/1987 | Bell | F42C 1/02 102/204 |
| 4,688,466 A | * | 8/1987 | Burkdoll | F42C 7/12 102/261 |
| 4,817,530 A | * | 4/1989 | Florin | F42B 3/16 102/204 |
| 4,978,089 A | * | 12/1990 | Alquier | B64C 1/32 102/223 |
| 5,104,067 A | * | 4/1992 | McIntyre | B64D 25/10 102/274 |
| 5,170,004 A | * | 12/1992 | Garrison | F42B 15/38 102/306 |
| 5,279,201 A | * | 1/1994 | Jena | B25C 1/163 102/466 |
| 5,365,851 A | * | 11/1994 | Shaw | F42D 1/04 102/275.11 |
| 5,753,849 A | * | 5/1998 | Posey | F42C 9/06 102/223 |
| 5,954,296 A | * | 9/1999 | Jahsman | B64C 1/32 244/121 |
| 6,272,996 B1 | | 8/2001 | O'Brien et al. | |
| 6,640,719 B1 | * | 11/2003 | Pacella | F42C 15/31 102/204 |
| 6,752,355 B1 | * | 6/2004 | Wood | B64C 1/1476 244/122 A |
| 6,845,947 B1 | * | 1/2005 | Reese, Jr. | B64C 1/1476 244/120 |
| 7,117,796 B1 | * | 10/2006 | Bogle | C06C 9/00 102/275.6 |
| 8,061,656 B1 | * | 11/2011 | Renn | B64C 1/1476 244/122 AE |
| 8,104,405 B2 | * | 1/2012 | LaFont | F42C 15/24 102/204 |
| 8,230,770 B1 | * | 7/2012 | Renn | B64C 1/1476 244/122 AF |
| 8,250,980 B1 | * | 8/2012 | Mackie-Smith | F42C 7/12 102/204 |
| 8,585,838 B1 | * | 11/2013 | Twomey | C06B 31/30 149/11 |
| 8,596,372 B2 | * | 12/2013 | Zhang | A62C 5/006 102/204 |
| 10,384,788 B2 | * | 8/2019 | Campbell | B64D 25/10 |
| 2002/0050223 A1 | * | 5/2002 | Jackson | F42C 19/10 102/470 |
| 2002/0125045 A1 | * | 9/2002 | George | E21B 43/119 175/4.54 |
| 2003/0164107 A1 | * | 9/2003 | Hilden | C06C 5/04 102/275.1 |
| 2008/0099204 A1 | * | 5/2008 | Arrell | E21B 43/1185 166/298 |
| 2008/0110365 A1 | * | 5/2008 | Rastegar | C06C 9/00 102/204 |
| 2008/0134922 A1 | * | 6/2008 | Grattan | E21B 43/1185 102/206 |
| 2010/0031841 A1 | * | 2/2010 | Michel | F42C 15/005 102/222 |
| 2010/0071577 A1 | * | 3/2010 | Rastegar | F42C 15/24 102/216 |
| 2010/0147176 A1 | * | 6/2010 | Alculumbre | F42C 15/16 102/256 |
| 2010/0251917 A1 | * | 10/2010 | Land | F42D 1/04 102/204 |
| 2011/0056598 A1 | * | 3/2011 | Twomey | C06B 21/0066 149/11 |
| 2011/0167994 A1 | * | 7/2011 | Au-Yeung | B64C 1/1492 89/1.14 |
| 2011/0201822 A1 | * | 8/2011 | Belmont | C07D 249/12 548/263.2 |
| 2012/0192746 A1 | * | 8/2012 | Pisella | F42C 15/184 102/251 |
| 2013/0277108 A1 | | 10/2013 | Greeley et al. | |
| 2014/0227548 A1 | * | 8/2014 | Myrick | C06B 45/30 428/570 |
| 2014/0338552 A1 | * | 11/2014 | Mace | F23O 21/00 102/215 |
| 2015/0000546 A1 | * | 1/2015 | Kotefski | B65D 90/36 102/481 |
| 2015/0176371 A1 | * | 6/2015 | Diaj | F42B 3/26 166/381 |
| 2015/0284926 A1 | | 10/2015 | Du et al. | |
| 2016/0153272 A1 | * | 6/2016 | Mace | E21B 43/263 |
| 2016/0183255 A1 | | 6/2016 | Okajima | |
| 2016/0282091 A1 | * | 9/2016 | Nieuwoudt | F42D 3/04 |
| 2017/0191810 A1 | * | 7/2017 | Bialy | F42B 5/38 |
| 2017/0297725 A1 | * | 10/2017 | Campbell | B64D 25/10 |
| 2019/0063892 A1 | * | 2/2019 | Brown | F42D 1/043 |
| 2019/0249970 A1 | * | 8/2019 | Wilson | F42C 7/00 |
| 2019/0249971 A1 | * | 8/2019 | Wilson | F42C 15/32 |

\* cited by examiner

HIGH EXPLOSIVE FIRING MECHANISM

GOVERNMENT LICENSE RIGHTS

This disclosure was made with Government support under Contract No. N0017411C0060 awarded by The United States Navy. The Government has certain rights in the disclosure.

FIELD OF THE DISCLOSURE

The present disclosure relates to high explosive firing mechanisms and methods, and more particularly, to high explosive firing mechanisms and methods in aircraft egress systems.

BACKGROUND OF THE DISCLOSURE

Modern aircraft egress systems typically utilize high explosive detonating sources to transfer an explosive signal between components within the egress system. Some devices utilize this high explosive detonating source as an initiation stimulus for primer actuated devices. However, primer actuated devices benefit from a specific input energy to function reliably and without damage. High explosive detonating sources may exceed the required input energy, leading to damaged system components.

SUMMARY OF THE DISCLOSURE

A high explosive firing mechanism may comprise a housing comprising a firing pin tube having a primer inlet and a firing pin disposed within the firing pin tube, the firing pin comprising a nub, wherein the nub partially extends into the primer inlet.

In various embodiments, the firing pin may further comprise a first face, a second face opposite the first face, an O-ring groove extending circumferentially around the firing pin and proximate to the second face, and a shear pin groove extending circumferentially around the firing pin and situated between the first face and O-ring groove. The nub may extend from the second face of the firing pin. The housing may further comprise a transition tube in fluid communication with the firing pin tube. The second face of the firing pin may be located a distance between 0.038 and 0.070 inches from a second surface of the firing pin tube at a first position. The housing may further comprise an input tube in fluid communication with the transition tube. The nub may be configured to impact a primer contained in the primer inlet at a second position. The high explosive firing mechanism may further comprise a shear pin extending through a housing aperture into the shear pin groove and an O-ring situated within the O-ring groove. The shear pin may be configured to mechanically fail at a threshold force on the shear pin.

An egress system for an aircraft may comprise a high explosive firing mechanism comprising a housing comprising a firing pin tube having a primer inlet, and a firing pin disposed within the firing pin tube, the firing pin comprising a nub, wherein the nub partially extends into the primer inlet.

In various embodiments, the egress system may further comprise an input component and output component coupled to the high explosive firing mechanism. The firing pin may further comprise a first face, a second face opposite the first face, an O-ring groove extending circumferentially around the firing pin and proximate to the second face, and a shear pin groove extending circumferentially around the firing pin and situated between the first face and O-ring groove. The second face of the firing pin may be configured to contact a second surface of the firing pin tube at a second position. The second face of the firing pin may be located a distance between 0.038 and 0.070 inches from a second surface of the firing pin tube at a first position. The housing may further comprise a transition tube in fluid communication with the firing pin tube and an input tube in fluid communication with the transition tube. The high explosive firing mechanism may further comprise a shear pin extending through a housing aperture into the shear pin groove and an O-ring situated within the O-ring groove. The shear pin may be configured to mechanically fail at a threshold force on the shear pin.

A method of transferring a high explosive signal may comprise forming an input tube and firing pin tube within a housing, inserting a firing pin into the firing pin tube such that a nub of the firing pin extends into a primer inlet, and inserting a high energy transfer line into the input tube.

In various embodiments, the method may further comprise igniting the high energy transfer line and impacting a primer with the firing pin.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft egress systems. However, various aspects of the disclosed embodiments may be adapted for optimized performance in a variety of other systems. As such, numerous applications of the present disclosure may be realized.

Figure 1:
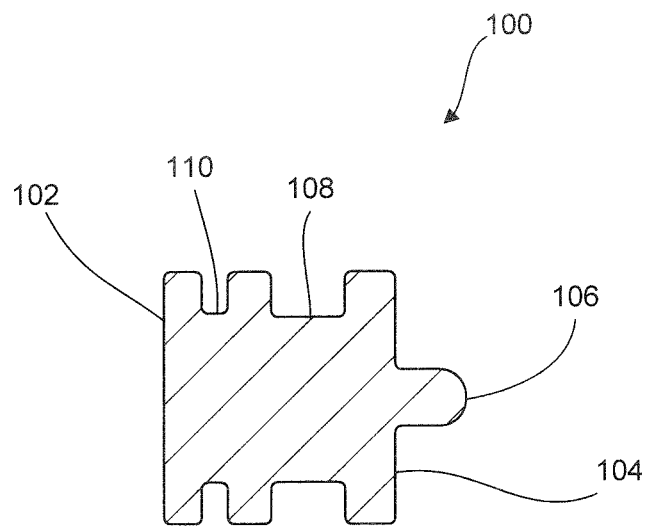
FIG. 1 illustrates a cross-sectional view of a firing pin in accordance with various embodiments.

Referring to FIG. 1, a cross-sectional view of a firing pin 100 is depicted in accordance with various embodiments. Firing pin 100 may comprise first face 102 and second face 104 opposite first face 102. Nub 106 may extend from second face 104 and be configured to impact a primer, such as primer 302 (with momentary reference to FIG. 3). Firing pin 100 may further comprise an O-ring groove 108 configured to receive an O-ring, such as O-ring 112 (with momentary reference to FIG. 3). O-ring groove 108 may extend circumferentially around firing pin 100 and be proximate to second face 104. Firing pin 100 may further comprise shear pin groove 110 configured to receive a shear pin, such as shear pin 114 (with momentary reference to FIG. 3). Shear pin groove 110 may extend circumferentially around firing pin 100 and be situated between first face 102 and O-ring groove 108. Firing pin 100 may be made from various materials, including but not limited to, steel, aluminum, titanium alloys or other materials capable of withstanding impact with primer 302 with limited deformation.

Figure 2:
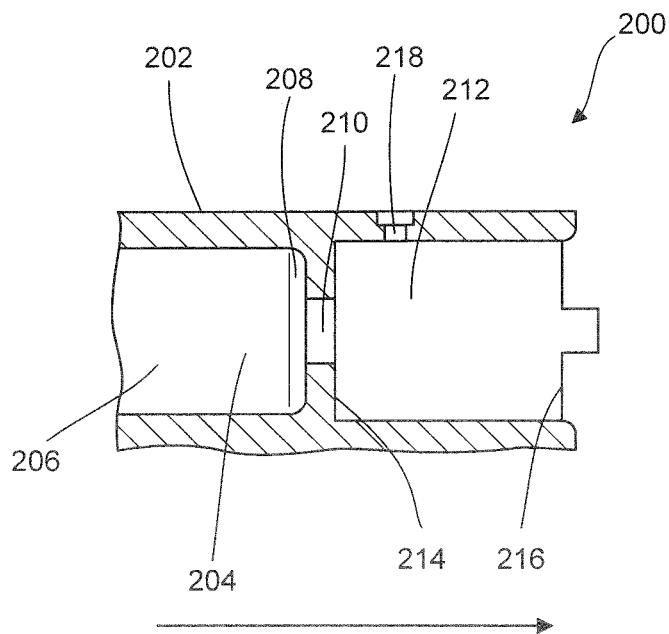
FIG. 2 illustrates a cross-sectional view of a high explosive firing mechanism in accordance with various embodiments.

Referring to FIG. 2, a cross-sectional view of high explosive firing mechanism 200 is depicted in accordance with various embodiments. High explosive firing mechanism 200 may form a portion of an egress system for an aircraft, however, high explosive firing mechanism 200 is not limited in this regard. High explosive firing mechanism 200 may be configured to transfer an explosive signal in the direction depicted by the arrow in FIG. 2. For example, high explosive firing mechanism 200 may be configured to receive an explosive signal from an input component coupled to high explosive firing mechanism 200 and relay the signal to an output component coupled to high explosive firing mechanism 200. High explosive firing mechanism 200 may comprise a housing 202. In various embodiments, housing 202 may comprise an exterior geometry in the shape of a cylinder or other suitable geometry configured to enclose firing pin 100. Housing 202 may comprise any suitable material capable of withstanding pressure forces resulting from combusting gases or forces from impact of primer 100 in housing 202. For example, housing 202, such as steel, aluminum, titanium, alloys of the aforementioned or other materials.

With further reference to FIG. 2, housing 202 may comprise an internal structure 204 configured to contain expanding gases and transfer an explosive signal. Housing 202 may comprise an input tube 206 comprising funnel portion 208, transition tube 210, and firing pin tube 212. Firing pin tube 212 may have a primer inlet 300. Input tube 206 may be configured to receive a high energy transfer line, such as for example, a high energy thin layer explosive, a detonating cord, an electrically initiated detonator, or the like. Funnel portion 208 may be configured to funnel the high energy transfer line into transition tube 210 where the high energy transfer line may terminate. Transition tube 210 may be situated between and be in fluid communication with firing pin tube 212 and input tube 206. Transition tube may be configured to transfer expanding gases from the high energy transfer line into firing pin tube 212. Firing pin tube 212 may comprise a first surface 214 and a second surface 216 opposite first surface 214. First surface 214 and second surface 216 may be configured to contain firing pin 100 in firing pin tube 212.

Figure 3A:
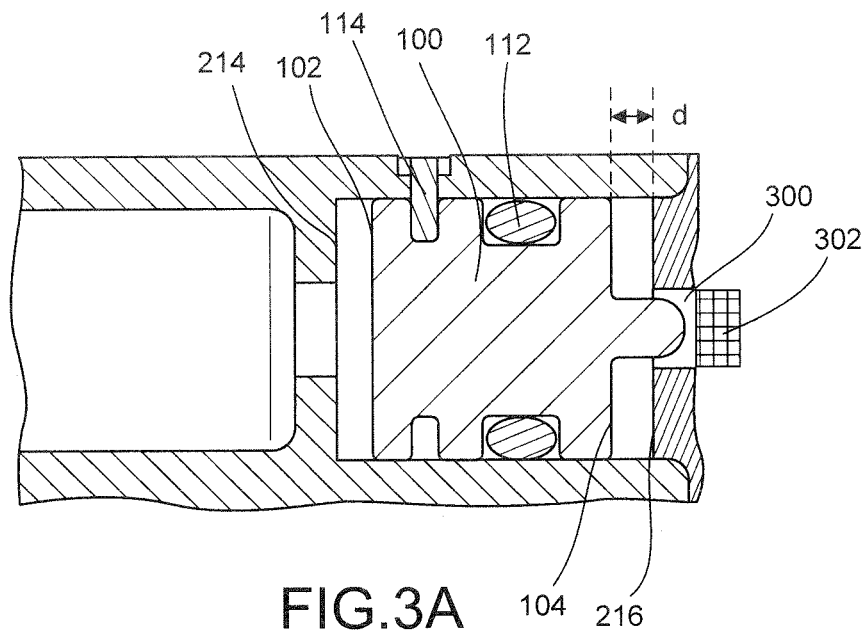
FIG. 3A illustrates a cross-sectional view of a firing pin positioned in a high explosive firing mechanism in a first position in accordance with various embodiments.

Referring to FIG. 3A, firing pin 100 is depicted in firing pin tube 212 in a first position in accordance with various embodiments. In the first position, first face 102 may be spaced apart from first surface 214 of firing pin tube 212. Second face 104 may be spaced apart from second surface 216. Firing pin 100 may comprise an O-ring 112 situated in O-ring groove 108 and a shear pin 114 extending through housing aperture 218 and into shear pin groove 110. O-ring 112 may be configured to seal gases and guide firing pin 100 as firing pin 100 travels through firing pin tube 212. Shear pin 114 may be configured to maintain firing pin 100 in the first position by mechanically inhibiting movement of firing pin 100 relative to housing 202. Second face 104 of firing pin 100 may be situated a distance d from second surface 216 of firing pin tube 212. For example in various embodiments, distance d may be between 0.038 inches (0.965 mm) and 0.070 inches (1.778 mm). In the first position, distance d may be such that nub 106 may at least partially extend into a primer inlet 300. Primer inlet 300 may contain primer 302, which may contain a pressure sensitive explosive capable of igniting in response to nub 106 impacting primer 302. Primer 302 be any suitable primer capable of initiating energetic devices, for example, generating initiators, rocket motor igniters, time delay initiators, or others. In various embodiments, primer 302 may be in the form of a percussion primer, such as a percussion primer available under the trademark M42C1 from Olin Corporation, however primer 302 is not limited in this regard.

Figure 3B:
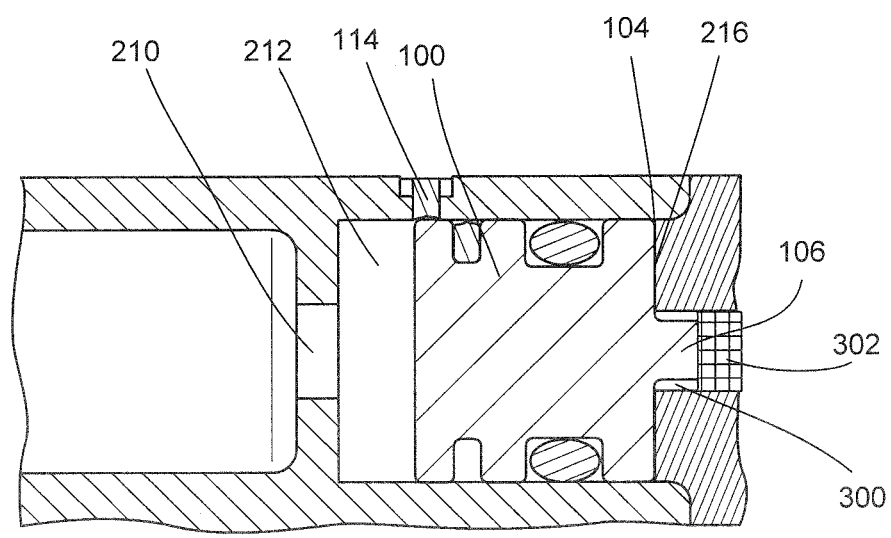
FIG. 3B illustrates a cross-sectional view of a firing pin positioned in a high explosive firing mechanism in a second position in accordance with various embodiments.

Referring to FIG. 3B, firing pin 100 is depicted in firing pin tube 212 in a second position in various embodiments. In response to the high energy transfer line igniting within input tube 206, combusting gases may enter transition tube 210 and portion of firing pin tube 212 behind first face 102 of firing pin 100. The combusting gases may raise the temperature of gases within transition tube 210 and firing pin tube 212, causing the gases to expand and exert a force on firing pin 100. As the gases continue to expand, forces continue to increase on firing pin 100. Upon reaching a threshold force (for example 180 lbf (800 N)) shear pin 114 may mechanically fail due to shear forces resulting from firing pin 100 pushing against shear pin 114. In response, firing pin 100 may be accelerated through firing pin tube 212 to the second position. In the second position, nub 106 may enter primer inlet 300 and impact primer 302. The impact of nub 106 on primer 302 may cause the pressure sensitive explosive in primer 302 to ignite, thereby igniting an energetic device coupled to high explosive firing mechanism 200. Forward momentum of firing pin 100 may be stopped in response to second face 104 of firing pin 100 contacting second surface 216 of firing pin tube 212.

Distance d may be selected such that nub 106 extends into primer inlet 300 and the distance between second face 104 and second surface 216 are reduced in the first position. By limiting distanced in this manner, travel distance of firing pin 100 in firing pin tube 212 may be reduced. Limiting travel distance of firing pin 100 may reduce the velocity of firing pin 100 and may reduce the energy of the impact of second face 104 on second surface 216 and nub 106 on primer 302. The reduced impact energy may reduce the frequency of structural failures such as punctured primers. Punctured primers may result in formation of leak paths for gases within the system, thereby adversely affecting performance of downstream components. Accordingly, distance d must be selected such that impact energy of second face 104 on second surface 216 and nub 106 on primer 302 are reduced to minimize damage of the components, while still generating enough impact energy to ignite primer 302. However, distance d may also be selected such that nub 106 does not accidentally impact primer 302 while components vibrate during normal aircraft operation.

Figure 4:
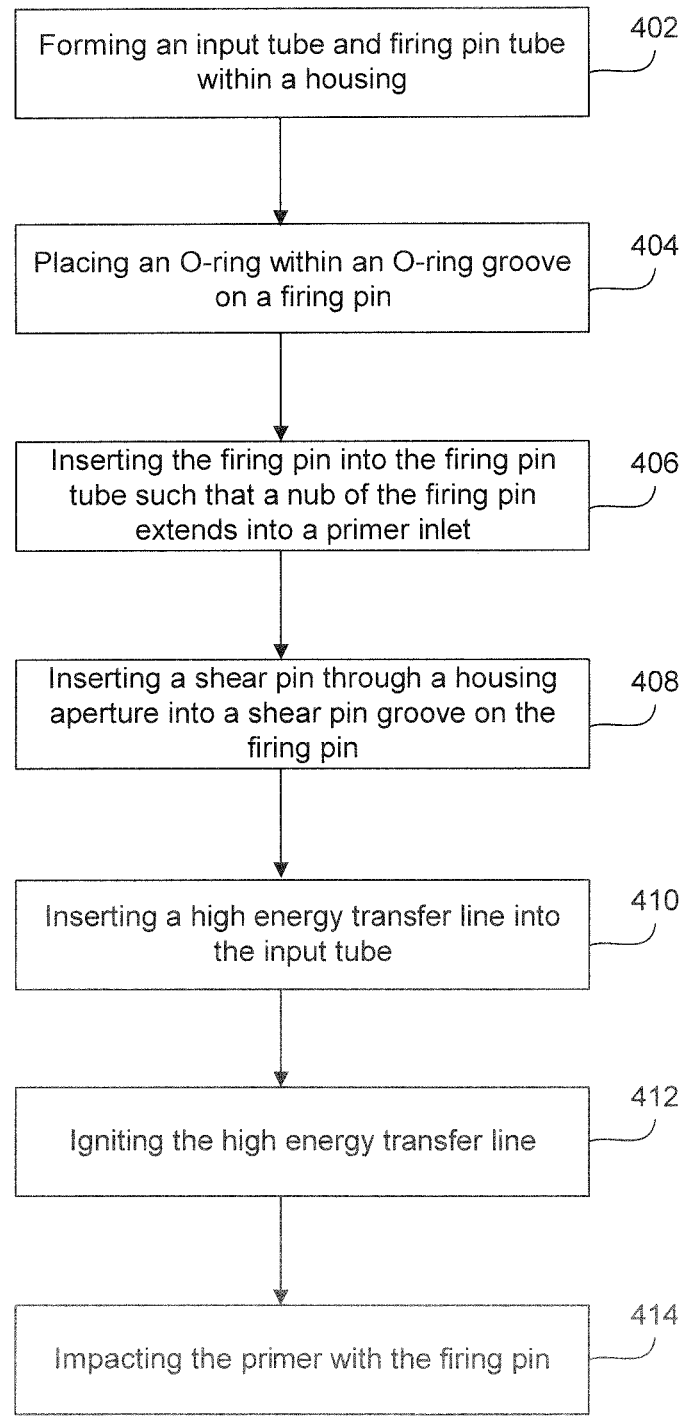
FIG. 4 depicts a flowchart illustrating a method of transferring a high explosive signal in accordance with various embodiments.

A block diagram illustrating a method 400 for transferring a high explosive signal such as through high explosive firing mechanism 200, is depicted in FIG. 4, in accordance with various embodiments. Method 400 may comprise forming an input tube and firing pin tube within a housing (step 402). The method may further comprise placing an O-ring within an O-ring groove on a firing pin (step 404). The method may further comprise inserting the firing pin into the firing in tube (step 406). The method may further comprise inserting a shear pin through a housing aperture into a shear pin groove on the firing pin (step 408). The method may further comprise inserting a high energy transfer line into the input tube (step 410). The method may further comprise igniting the high energy transfer line (step 412). The method may further comprise impacting a primer cap with the firing pin (step 414). Method 400 is not limited in this regard. For example, any of the steps listed above may be performed in a different order.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A high explosive firing mechanism, comprising:
a housing comprising,
   a firing pin tube having a first tube portion that extends to an end wall that closes an open end of the firing pin tube, and a primer inlet that extends through the end wall, wherein the first tube portion comprises a first diameter and the primer inlet comprises a second diameter that is less than the first diameter;
   a firing pin comprising a first firing pin portion disposed within the first tube portion of the firing pin tube, the firing pin further comprising an end face and a nub that protrudes from the end face, wherein the end face of the firing pin is spaced from the end wall and the nub partially extends into the primer inlet prior to activation of the high explosive firing mechanism; and
   a transition tube in fluid communication with the firing pin tube; and
a high energy transfer line coupled to the housing and configured to transfer expanding gases to the firing pin, wherein the high explosive firing mechanism forms a portion of an egress system.

2. The high explosive firing mechanism of claim 1, wherein the firing pin further comprises a first face, an O-ring groove extending circumferentially around the firing pin, and a shear pin groove extending circumferentially around the firing pin and situated between the first face and O-ring groove, wherein the O-ring groove is situated between the end face and the shear pin groove.

3. The high explosive firing mechanism of claim 2, wherein a spacing between an end of the nub and the end face of the firing pin is greater than a spacing between the end face of the firing pin and the end wall of firing pin tube.

4. The high explosive firing mechanism of claim 2, wherein the end face of the firing pin is located a distance between 0.038 and 0.070 inches from the end wall of the firing pin tube in a first position for the firing pin.

5. The high explosive firing mechanism of claim 1, wherein the housing further comprises an input tube in fluid communication with the transition tube.

6. The high explosive firing mechanism of claim 1, wherein the nub is configured to impact a primer contained in the primer inlet in a second position for the firing pin.

7. The high explosive firing mechanism of claim 2, further comprising a shear pin extending through a housing aperture into the shear pin groove and an O-ring situated within the O-ring groove.

8. The high explosive firing mechanism of claim 7, wherein the shear pin is configured to mechanically fail at a threshold force on the shear pin.

9. An egress system for an aircraft, comprising:
a high explosive firing mechanism, comprising,
a housing comprising,
a firing pin tube having a first tube portion that extends to an end wall that closes an open end of the firing pin tube, and a primer inlet that extends through the end wall, wherein the first tube portion comprises a first diameter and the primer inlet comprises a second diameter that is less than the first diameter;
a firing pin comprising a first firing pin portion disposed within the first tube portion of the firing pin tube, the firing pin further comprising an end face and a nub that protrudes from the end face, wherein the end face of the firing pin is spaced from the end wall and the nub partially extends into the primer inlet prior to activation of the high explosive firing mechanism; and
a transition tube in fluid communication with the firing pin tube; and
a high energy transfer line coupled to the housing and configured to transfer expanding gases to the firing pin, wherein the high explosive firing mechanism forms a portion of the egress system.

10. The egress system of claim 9, further comprising an input component and output component coupled to the high explosive firing mechanism.

11. The egress system of claim 9, wherein the firing pin further comprises a first face, an O-ring groove extending circumerentially around the firing pin, and a shear pin groove extending circumferentially around the firing pin and situated between the first face and O-ring groove, wherein the O-ring groove is situated between the end face and the shear pin groove.

12. The egress system of claim 11, wherein the end face of the firing pin is configured to contact the end wall of the firing pin tube when the firing pin is in a second position, and wherein the end face of the firing pin is spaced from the end wall of the firing pin tube when the firing pin is in a first position.

13. The egress system of claim 12, wherein the end face of the firing pin is located a distance between 0.038 and 0.070 inches from the end wall of the firing pin tube when the firing pin is in the first position.

14. The egress system of claim 12, wherein the nub is configured to impact a primer contained in the primer inlet when the firing pin is in the second position.

15. The egress system of claim 11, wherein the high explosive firing mechanism further comprises a shear pin extending through a housing aperture into the shear pin groove and an O-ring situated within the O-ring groove.

16. The egress system of claim 15, wherein the shear pin is configured to mechanically fail at a threshold force on the shear pin.

17. A method of transferring a high explosive signal, comprising:
forming an input tube and firing pin tube within a housing, wherein the firing pin tube comprises a first tube portion, wherein the first tube portion comprises a first diameter;
inserting an O-ring in an O-ring groove of a firing pin;
inserting the firing pin into the firing pin tube, wherein the firing pin comprises a first firing pin portion disposed within the first tube portion of the firing pin tube, the firing pin further comprising an end face and a nub that protrudes from the end face, wherein an end wall closes an open end of the firing pin tube, and wherein a primer inlet extends through the end wall and comprises a second diameter that is less than the first diameter; and
inserting a high energy transfer line into the input tube, wherein the housing forms a portion of an egress system, wherein the end face of the firing pin is spaced from the end wall and the nub of the firing pin extends into a primer inlet prior to activation of the high energy transfer line.

18. The method of claim 17, further comprising, igniting the high energy transfer line; and impacting a primer with the firing pin.

* * * * *